US010012195B2

(12) United States Patent
Kounosu et al.

(10) Patent No.: US 10,012,195 B2
(45) Date of Patent: Jul. 3, 2018

(54) FUEL SUPPLY DEVICE AND FUEL SUPPLY METHOD

(71) Applicant: Mitsui Engineering & Shipbuilding Co., Ltd., Chuo-ku, Tokyo (JP)

(72) Inventors: Makoto Kounosu, Tokyo (JP); Seiichi Kitamura, Tamano (JP); Renzo Kanda, Tokyo (JP)

(73) Assignee: Mitsui Engineering & Shipbuilding Co., Ltd. (JP)

( * ) Notice: Subject to any disclaimer, the term of this patent is extended or adjusted under 35 U.S.C. 154(b) by 0 days.

(21) Appl. No.: 15/566,688

(22) PCT Filed: Apr. 7, 2016

(86) PCT No.: PCT/JP2016/061405
§ 371 (c)(1),
(2) Date: Oct. 13, 2017

(87) PCT Pub. No.: WO2016/167174
PCT Pub. Date: Oct. 20, 2016

(65) Prior Publication Data
US 2018/0119658 A1 May 3, 2018

(30) Foreign Application Priority Data

Apr. 13, 2015 (JP) ................. 2015-081616

(51) Int. Cl.
*F02M 59/26* (2006.01)
*F04B 49/06* (2006.01)
(Continued)

(52) U.S. Cl.
CPC ............ *F02M 59/26* (2013.01); *F02M 37/08* (2013.01); *F02M 37/12* (2013.01); *F04B 49/06* (2013.01);
(Continued)

(58) Field of Classification Search
CPC ........ F02M 59/02; F02M 59/26; F02M 37/06; F02M 37/08; F02M 37/12; F02M 39/02; F02M 57/023; F04B 49/06; F04B 9/042
See application file for complete search history.

(56) References Cited

U.S. PATENT DOCUMENTS 3,179,056 A * 4/1965 Wright ..................... F04B 9/10
417/346
3,323,461 A * 6/1967 Bennett ..................... F01B 3/06
417/339
(Continued)

FOREIGN PATENT DOCUMENTS

JP  S57-020589  2/1982
JP  S64-032163  2/1989
(Continued)

OTHER PUBLICATIONS

International Search Report for International Application No. PCT/JP2016/061405 dated May 17, 2016, 4 pages, Japan.

*Primary Examiner* — Mahmoud Gimie
*Assistant Examiner* — Josh Campbell
(74) *Attorney, Agent, or Firm* — Thorpe North & Western

(57) ABSTRACT

A fuel supply device includes: a linear actuator; a reciprocating pump having a boosting piston driven by the linear actuator, configured to axially reciprocate, and configured to alternately repeat suction of the fuel and ejection of the fuel more boosted than the fuel at a time of suction by reciprocation of the boosting piston; and a controller to control driving of the linear actuator. When reciprocation amplitude of the boosting piston is A (A>0) and a reciprocating cycle time is T, the controller controls the linear actuator so a maximum value of an absolute value of acceleration when the reciprocating pump sucks the fuel with an absolute value of speed of the boosting piston increasing is smaller than $A \cdot (2\pi/T)^2$, and so a maximum value of the absolute value of (Continued)

the acceleration of the boosting piston when the reciprocating pump ejects the fuel is larger than $A \cdot (2\pi/T)^2$.

9 Claims, 5 Drawing Sheets

(51) Int. Cl.
    *F02M 37/12*     (2006.01)
    *F02M 37/08*     (2006.01)
    *F02M 39/02*     (2006.01)
    *F02M 37/06*     (2006.01)
    *F02M 57/02*     (2006.01)
    *F04B 9/04*     (2006.01)
    *F02M 59/02*     (2006.01)

(52) U.S. Cl.
    CPC ............. *F02M 37/06* (2013.01); *F02M 39/02* (2013.01); *F02M 57/023* (2013.01); *F02M 59/02* (2013.01); *F04B 9/042* (2013.01)

(56) References Cited

U.S. PATENT DOCUMENTS

| | | | | |
|---|---|---|---|---|
| 4,173,437 A | * | 11/1979 | Leka | F04B 1/02 417/521 |
| 4,448,692 A | * | 5/1984 | Nakamoto | B01D 15/14 210/101 |
| 5,647,310 A | * | 7/1997 | Kimura | F01L 1/08 123/90.6 |
| 5,688,110 A | * | 11/1997 | Djordjevic | F02M 37/06 417/254 |
| 6,213,096 B1 | * | 4/2001 | Kato | F02B 61/045 123/456 |
| 6,694,952 B1 | * | 2/2004 | Yamazaki | F02M 59/102 123/496 |
| 7,013,872 B2 | * | 3/2006 | Yamazaki | F02D 41/3094 123/431 |
| 2002/0085921 A1 | | 7/2002 | Gram et al. | |
| 2003/0029424 A1 | * | 2/2003 | Ryuzaki | F02M 59/08 123/456 |
| 2004/0105759 A1 | | 6/2004 | Gram et al. | |
| 2004/0164013 A1 | | 8/2004 | Takao et al. | |
| 2009/0071974 A1 | | 3/2009 | Ikushima | |
| 2009/0272365 A1 | * | 11/2009 | Kunz | F02M 59/102 123/508 |
| 2011/0132463 A1 | * | 6/2011 | Witt | F04B 11/0058 137/1 |
| 2015/0369228 A1 | | 12/2015 | Kounosu et al. | |

FOREIGN PATENT DOCUMENTS

| | | |
|---|---|---|
| JP | S6432163 A * | 2/1989 |
| JP | H11-324931 | 11/1999 |
| JP | 2004-150402 | 5/2004 |
| JP | 2005-504927 | 2/2005 |
| JP | 2005-054699 | 3/2005 |
| JP | 5519857 | 6/2014 |
| WO | WO 2003/031817 | 4/2003 |
| WO | WO 2006/085433 | 8/2006 |
| WO | WO 2015/099106 | 7/2015 |

* cited by examiner

FUEL SUPPLY DEVICE AND FUEL SUPPLY METHOD

TECHNICAL FIELD

The present technology relates to a fuel supply device and a fuel supply method for supplying fuel to an internal combustion engine such as a diesel engine.

BACKGROUND ART

In conventional ships, a two-stroke low speed diesel engine that can output at low speeds and can be driven in a state of being directly connected to a propeller.

In recent years, natural gas with low $NO_x$ and $SO_x$ emissions has received attention as fuel for low speed diesel engines. By injecting high pressure natural gas as fuel into a combustion chamber of a low speed diesel engine and burning it, an output can be obtained with high heat efficiency.

In conventional ships, a two-stroke low speed diesel engine is used. The diesel engine can output at low speeds and is driven, directly connected to a propeller.

In recent years, natural gas with low $NO_x$ and $SO_x$ emissions has received attention as a fuel for low speed diesel engines. By injecting high pressure natural gas as a fuel into a combustion chamber of a low speed diesel engine and burning it, an output can be obtained with high heat efficiency.

For example, a reciprocating pump is driven by converting the rotational motion to the reciprocating motion using a crankshaft. In a case where a piston of the reciprocating pump is driven using the crankshaft, since the piston stroke is determined by the crankshaft, it is not possible to freely adjust the piston stroke. In addition, in a case where a plurality of reciprocating pumps is driven by an identical crankshaft, it is difficult to independently control the individual reciprocating pumps.

Meanwhile, Japanese Unexamined Patent Application Publication No. JP 2005-504927 ("JP 2005-504927") describes a device that boosts liquid fuel using a reciprocating pump and supplies the boosted fuel to the engine. In the device in JP 2005-504927, a piston of the reciprocating pump is driven in the left-right direction, and a "linear hydraulic motor" (hydraulic cylinder unit) is used as a linear actuator that drives a piston. In JP 2005-504927, the moving direction of the piston of the reciprocating pump is switched by switching, with a direction switching valve, the direction of the hydraulic fluid supplied from the hydraulic pump to the hydraulic cylinder unit. With the use of the hydraulic cylinder unit, it is possible to drive the reciprocating pump at a lower speed than the case where the crankshaft is used. Moreover, this method has an advantage that the piston stroke can be controlled so as to allow the piston to move at a constant speed.

In the case of switching the moving direction of the piston of the reciprocating pump by switching the direction of the hydraulic fluid supplied to the hydraulic cylinder unit by a direction switching valve as described in JP 2005-504927, the force acting on the piston from the supplied hydraulic fluid is equal at ejection and at suction. On the other hand, the reciprocating pump needs a large force when ejecting fuel at a high pressure, while the load is small when sucking low pressure fuel. For this reason, in a case where the reciprocating pump is driven using the hydraulic cylinder unit, the piston is more likely to move at a higher speed at suction when the load of the piston is small, and thus, the pressure inside the cylinder of the reciprocating pump occasionally becomes lower than the vapor pressure of the fuel, increasing the possibility of occurrence of cavitation. The occurrence of cavitation leads to a problem of erosion occurring in the piston and cylinder of the reciprocating pump, causing shorter life.

Moreover, since the piston speed remains the same at ejection and at suction in a case where the reciprocating pump is driven using the crankshaft, it is difficult to change solely the speed at the time of suction, leading to the occurrence of cavitation at high rotation and high output.

SUMMARY

The present technology provides a fuel supply device and a fuel supply method capable of suppressing cavitation occurring in a reciprocating pump.

The first of the technology is a fuel supply device for supplying fuel into a combustion chamber of an internal combustion engine. The fuel supply device includes:

a linear actuator;

a reciprocating pump having a boosting piston driven by the linear actuator and configured to reciprocate in an axial direction, the reciprocating pump being configured to alternately repeat suction of the fuel and ejection of the fuel more boosted than the fuel at a time of suction by reciprocation of the boosting piston in the axial direction; and a controller configured to control driving of the linear actuator.

When an amplitude of reciprocation of the boosting piston in the axial direction is A (A>0) and a reciprocating cycle time is T, the controller is configured to control the linear actuator such that a maximum value of an absolute value of acceleration at a time when the reciprocating pump sucks the fuel with an absolute value of speed of the boosting piston increasing is smaller than $A \cdot (2\pi/T)^2$, and such that a maximum value of the absolute value of the acceleration of the boosting piston at a time when the reciprocating pump ejects the fuel is larger than $A \cdot (2\pi/T)^2$.

The second aspect of the technology is a fuel supply device for supplying fuel into a combustion chamber of an internal combustion engine. The fuel supply device includes:

a low pressure fuel supply pipe to which low pressure fuel is supplied;

a high pressure fuel supply pipe to which high pressure fuel to be supplied into the combustion chamber is supplied;

a plurality of fuel supply units provided between the low pressure fuel supply pipe and the high pressure fuel supply pipe, each of the fuel supply units being configured to boost the fuel in the low pressure fuel supply pipe and supply the boosted fuel to the high pressure fuel supply pipe; and a control unit configured to control the plurality of fuel supply units.

Each of the fuel supply units includes:

a linear actuator;

a reciprocating pump having a boosting piston driven by the linear actuator and configured to reciprocate in an axial direction, the reciprocating pump being configured to alternately repeat suction of the fuel and ejection of the fuel more boosted than the fuel at a time of suction by reciprocation of the boosting piston in the axial direction; and a controller configured to control driving of the linear actuator.

When an amplitude of reciprocation of the boosting piston in the axial direction is A (A>0) and a reciprocating cycle time is T, the controller is configured to control the linear actuator such that a maximum value of an absolute value of acceleration at a time when the reciprocating pump sucks the fuel with an absolute value of speed of the boosting piston increasing is smaller than $A \cdot (2\pi/T)^2$, and such that a maximum value of the absolute value of the acceleration of the boosting piston at a time when the reciprocating pump ejects the fuel is larger than $A \cdot (2\pi/T)^2$, and the control unit controls each of the controllers such that, when any one of the plurality of fuel supply units ejects fuel, another fuel supply unit sucks the fuel.

The controller is preferably configured to control the linear actuator such that a point of achieving the maximum value of the acceleration of the boosting piston at the time when the reciprocating pump sucks the fuel comes after a point of starting suction of the fuel and before an elapsed time from the point of starting suction of the fuel reaches ¼ time of the cycle time.

The reciprocating pump preferably includes a boosting cylinder accommodating the boosting piston, the boosting piston vertically moving, and is preferably configured to suck the fuel into a portion inside the boosting cylinder below the boosting piston by vertical upward movement of the boosting piston, and is preferably configured to control boost and eject the fuel by vertical downward movement of the boosting piston.

The fuel supply device preferably further includes a speed sensor for detecting the speed of the boosting piston in the axial direction.

Preferably, the linear actuator is a hydraulic cylinder unit, the hydraulic cylinder unit including:

a hydraulic cylinder having a hydraulic fluid accommodation space for accommodating hydraulic fluid and arranged such that the axial direction of the hydraulic cylinder is aligned with a vertical direction;

a hydraulic piston movably arranged in the axial direction within the hydraulic cylinder, and configured to partition the hydraulic fluid accommodation space into a first chamber and a second chamber;

a piston rod configured to couple the hydraulic piston with the boosting piston;

a hydraulic pump configured to move the hydraulic piston in a first direction in the axial direction by supplying hydraulic fluid to the first chamber and to move the hydraulic piston in a second direction in the axial direction by supplying hydraulic fluid to the second chamber; and an electric motor configured to drive the hydraulic pump such that the hydraulic piston reciprocates in the axial direction, and the controller is configured to control a movement of the hydraulic piston within the hydraulic cylinder by controlling the electric motor.

Preferably, the hydraulic cylinder unit further includes:

a first hydraulic pipe with an internal space closed therein, the first hydraulic pipe having one end of which connected to the hydraulic pump and the other end connected to the first chamber and configured to direct all the hydraulic fluid ejected from the hydraulic pump toward the first chamber for supply and configured to return all the hydraulic fluid discharged from the first chamber toward the hydraulic pump; and a second hydraulic pipe with an internal space closed therein, the second hydraulic pipe having one end of which connected to the hydraulic pump and the other end connected to the second chamber and configured to direct toward the second chamber all the hydraulic fluid ejected from the hydraulic pump for supply and configured to return toward the hydraulic pump all the hydraulic fluid discharged from the second chamber.

The linear actuator may be an electric cylinder unit. The electric cylinder unit preferably includes:

an electric motor;

a ball nut configured to rotate by the power of the electric motor; and a ball screw to which the ball nut is screwed, being coupled with the boosting piston, an axial direction of the ball screw being aligned with the axial direction of the boosting piston, and configured to move in the axial direction by rotation of the ball nut. The controller preferably is preferably configured to control movement of the ball screw in the axial direction by controlling the electric motor.

The third aspect of the technology is a fuel supply method for supplying fuel into a combustion chamber of an internal combustion engine. The fuel supply method includes a step of controlling a linear actuator that is configured to drive a boosting piston to reciprocate in an axial direction thereof for alternately repeating suction of the fuel and ejection of the fuel more boosted than the fuel at a time of suction. When an amplitude of reciprocation in the axial direction of the boosting piston in a reciprocating pump is A (A>0) and a reciprocating cycle time of the reciprocation is T, the linear actuator is controlled, such that a maximum value of an absolute value of acceleration at a time of the suction of the fuel with an absolute value of speed of a boosting piston increasing is smaller than $A \cdot (2\pi/T)^2$, and such that a maximum value of the absolute value of the acceleration of the boosting piston at a time of the ejection of the fuel is larger than $A \cdot (2\pi/T)^2$.

According to the present technology, it is possible to prevent sudden decrease in the pressure inside the boosting cylinder and to suppress the occurrence of cavitation.

DETAILED DESCRIPTION

Hereinafter, a fuel supply device according to an embodiment of the present technology will be described with reference to the drawings.

Figure 1:
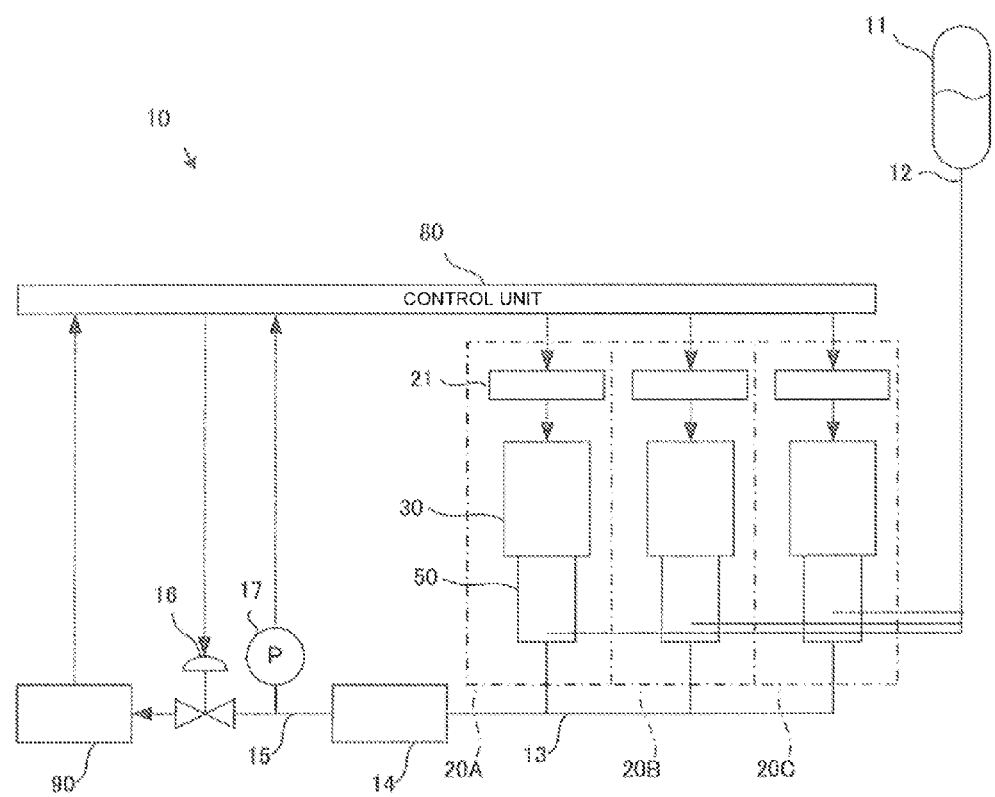
FIG. 1 is a schematic diagram of a configuration of a fuel gas supply device according to the present embodiment.

As illustrated in FIG. 1, a fuel supply device 10 of a present embodiment is a device that boosts and heats a liquid fuel and supply it into the combustion chamber of an internal combustion engine 90 by injecting the fuel at a high pressure. The internal combustion engine 90 is a prime mover that burns fuel in a combustion chamber in a cylinder and works with generated thermal energy, for example, a reciprocating engine, and a gas turbine. In particular, it is preferable to use as the internal combustion engine 90 a diesel engine that performs compression ignition of the fuel. The following embodiments describe a case where the internal combustion engine 90 is applied to a diesel engine mounted on a ship. Alternatively, the present technology can also be applied to a fuel supply device for a diesel engine other than a ship.

As illustrated in FIG. 1, the fuel supply device 10 includes a liquid fuel tank 11, a low pressure fuel supply pipe 12, a plurality of fuel supply units 20A, 20B, and 20C, a high pressure fuel supply pipe 13, a heat exchanger 14, a high temperature fuel supply pipe 15, a pressure regulating valve 16, a pressure gauge 17, and a control unit 80. All of these components of the fuel supply device 10 are mounted on a ship.

The liquid fuel tank 11 stores the fuel supplied to the internal combustion engine 90 in a liquid state. Examples of the liquid fuel stored in the liquid fuel tank 11 include liquefied methane, liquefied ethane, and liquefied propane. The liquid fuel tank 11 is connected to the low pressure fuel supply pipe 12 and supplies the liquid fuel to the fuel supply units 20A, 20B, and 20C via the low pressure fuel supply pipe 12.

The pressure of the liquid fuel in the low pressure fuel supply pipe 12 at a connecting portion with the fuel supply units 20A, 20B, and 20C is a pressure corresponding to the temperature and the height of the liquid surface of the liquid fuel in the liquid fuel tank 11, or the like. For the purpose of increasing this pressure to ensure a net positive suction head (NPSH), and to facilitate supply of liquid fuel to the fuel supply units 20A, 20B, and 20C, the liquid fuel tank 11 is arranged at a position higher than the fuel supply units 20A, 20B, and 20C.

Note that in a case where it is difficult to arrange the liquid fuel tank 11 at a high position, it is allowable to ensure the net positive suction head by increasing the pressure of the liquid fuel in the liquid fuel tank 11 using a booster pump for supplying the liquid fuel to the liquid fuel tank 11.

The fuel supply units 20A, 20B, and 20C are provided in parallel with each other at a position between the low pressure fuel supply pipe 12 and the high pressure fuel supply pipe 13. Each of the fuel supply units 20A, 20B, and 20C includes a controller 21, a linear actuator 30, and a reciprocating pump 50.

The reciprocating pump 50 boosts the liquid fuel supplied from the low pressure fuel supply pipe 12 and supplies the boosted liquid fuel to the heat exchanger 14 via the high pressure fuel supply pipe 13. The low pressure fuel pipe 12 and the high pressure fuel supply pipe 13 are detachable from the fuel supply units 20A, 20B and 20C.

The linear actuator 30 drives the piston of the reciprocating pump 50. By using the linear actuator 30, it is possible to drive the piston of the reciprocating pump 50 at a lower speed than in the case of using the crankshaft, and possible to control the drive of the piston so as to move at a constant speed at piston strokes except for times of the start of the liquid inflow of the reciprocating pump, the start of liquid boosting, and the end of the liquid boosting. Examples of the applicable linear actuator 30 include a hydraulic cylinder unit and an electric cylinder unit. A present embodiment will describe a case where a hydraulic cylinder unit is used as the linear actuator 30.

Controlled by a control signal input from the control unit 80, the controller 21 controls the linear actuator 30. Moreover, a position signal indicating the position of the piston of the reciprocating pump 50 is input into the controller 21 as described below. The controller 21 controls the linear actuator 30 such that the ejection amount of the reciprocating pump 50 is adjusted in accordance with the position signal.

Note that while the three fuel supply units 20A, 20B, and 20C are provided in parallel with each other between the low pressure fuel supply pipe 12 and the high pressure fuel supply pipe 13 in FIG. 1, the number of fuel supply units is not limited to this but can be flexibly changed in accordance with the amount of fuel to be supplied.

The inlet side of the heat exchanger 14 is connected to the high pressure fuel supply pipe 13, and the outlet side thereof is connected to the high temperature fuel supply pipe 15. The heat exchanger 14 heats the boosted liquid fuel supplied via the high pressure fuel supply pipe 13. As the heat source for heating the liquid fuel, for example, the combustion heat of the boil-off gas generated in the liquid fuel tank 11 can be used. For example, it is allowable to heat the liquid fuel by heat exchange with warm water heated by the combustion heat of the boil-off gas.

The high temperature fuel supply pipe 15 includes a pressure regulating valve 16, and one end of the high temperature fuel supply pipe 15 is connected to the heat exchanger 14 and the other end is connected to the combustion chamber of the internal combustion engine 90. After the liquid fuel heated by the heat exchanger 14 is then regulated by the pressure regulating valve 16 to a pressure within a predetermined range needed by the internal combustion engine 90, and thereafter the liquid fuel is supplied to the combustion chamber of the internal combustion engine 90 via the high temperature fuel supply pipe 15. The pressure regulating valve 16 is controlled by the control unit 80.

Note that the pressure within the predetermined range needed by the internal combustion engine 90 varies depending on the type and performance of the internal combustion engine 90. In a case where the internal combustion engine 90 is a low speed two-stroke diesel engine for a ship, the pressure within a predetermined range is, for example, 5 MPa to 100 MPa, preferably 20 MPa to 70 MPa, although the present technology is not limited thereto.

Moreover, the high temperature fuel supply pipe 15 includes the pressure gauge 17. The pressure gauge 17 measures the pressure in the high temperature fuel supply pipe 15 and outputs the measurement signal to the control unit 80.

A signal indicating the load of the internal combustion engine 90 is input from the internal combustion engine 90 into the control unit 80. The signal indicating the load of the internal combustion engine 90 is, for example, a signal indicating the rotation speed.

The control unit 80 adjusts the ejection amount of the reciprocating pump 50 by outputting a control signal to the fuel supply units 20A, 20B, and 20C. The ejection amount of the reciprocating pump 50 is adjusted such that the pressure in the high temperature fuel supply pipe 15 becomes a pressure corresponding to necessary load of the internal combustion engine 90.

Note that it is allowable to measure the rotation speed of a propelling propeller (not illustrated) driven by the internal combustion engine 90 and adjust the pressure in the high temperature fuel supply pipe 15 in accordance with the rotation speed.

The liquid fuel tank 11, the low pressure fuel supply pipe 12, the linear actuator 30, the reciprocating pump 50, the high pressure fuel supply pipe 13, the heat exchanger 14, the high temperature fuel supply pipe 15, the pressure regulating valve 16, and the pressure gauge 17 are arranged at hazardous areas. In contrast, the controller 21 and the control unit 80 are generally non-explosion-proof products. In a case where they are not explosion-proof, they should be arranged in a non-hazardous area separated from the hazardous areas by explosion-proof walls, or should be arranged in a non-explosion-proof area sufficiently away from the hazardous areas.

Next, with reference to FIGS. 2 and 3, a specific configuration of the linear actuator 30 and the reciprocating pump 50 using a servo motor as the electric motor will be described in detail. While the following description is a case where a hydraulic cylinder unit is used as the linear actuator 30, the linear actuator 30 is not limited to a hydraulic cylinder unit.

Figure 2:
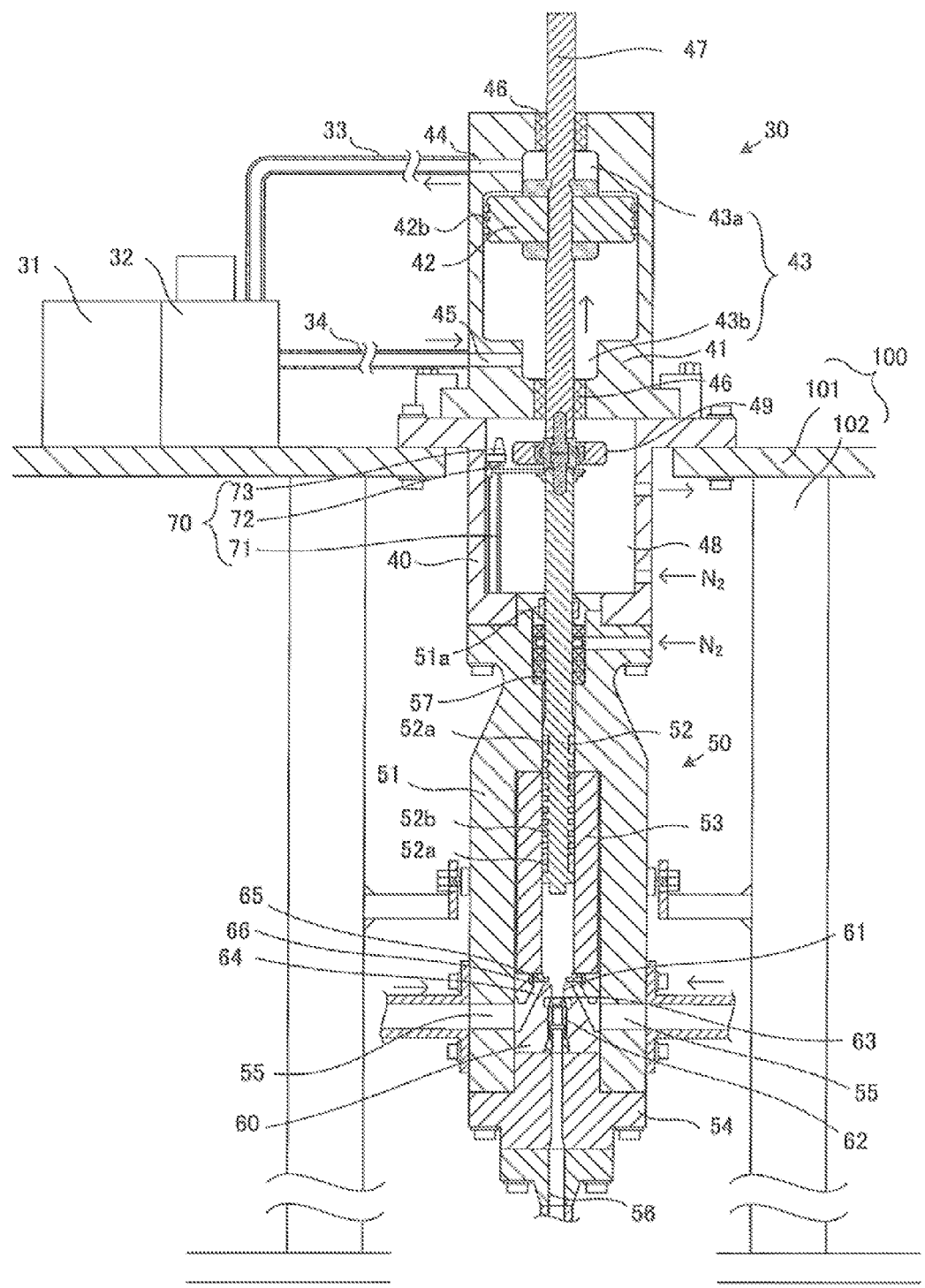
FIG. 2 is a cross-sectional view of a linear actuator 30 and a reciprocating pump 50 at the time of fuel suction.
Figure 3:
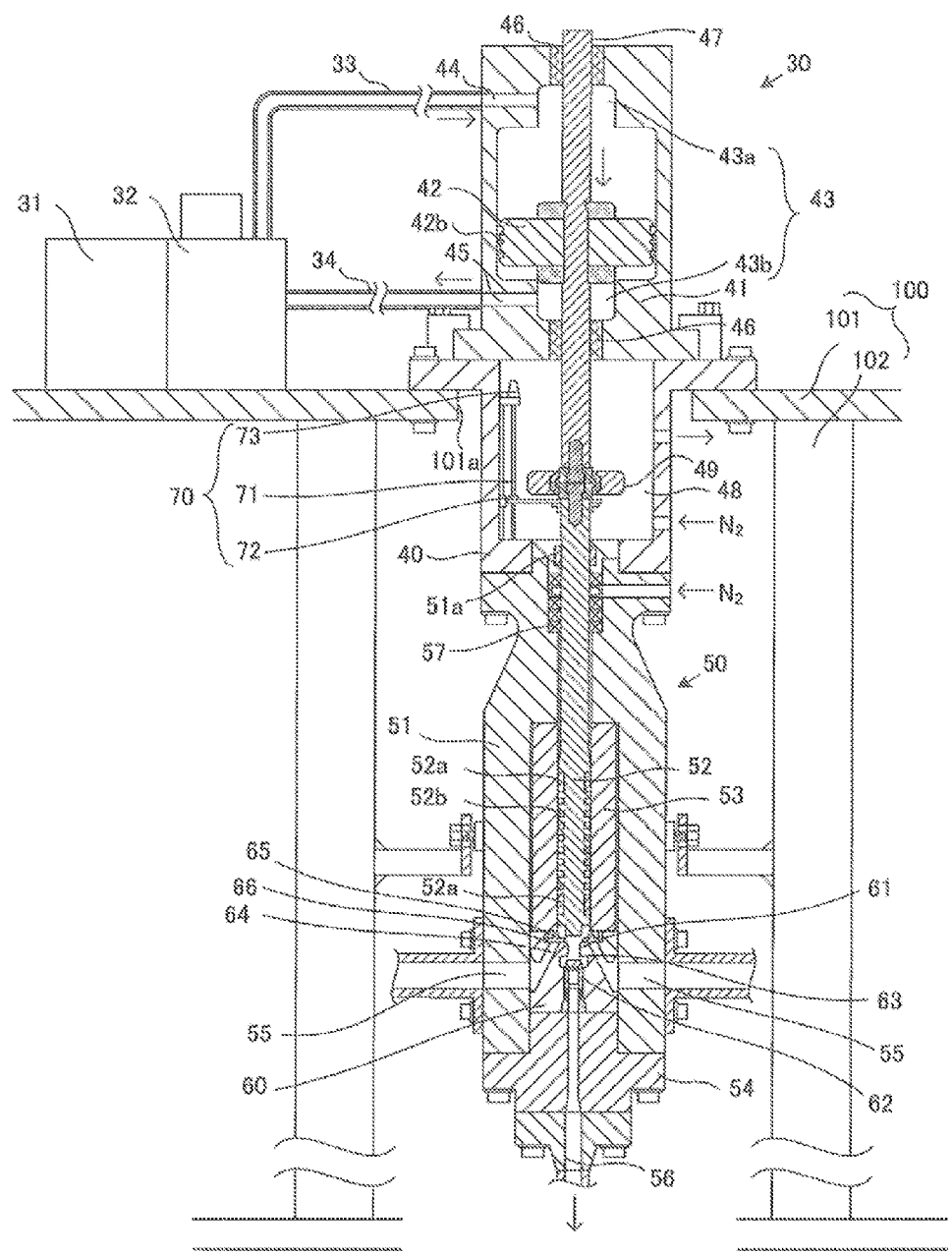
FIG. 3 is a cross-sectional view of the linear actuator 30 and the reciprocating pump 50 at the time of ejecting fuel.

In FIGS. 2 and 3, the up-down direction corresponds to the vertical direction, and the left-right direction corresponds to the horizontal direction. In the following description, the upward direction in the vertical direction will be referred to as "upper" (or "above"), a portion in the upper direction as "upper portion", the lower direction in the vertical direction as "lower" (or "below"), and a portion in the lower direction as "lower portion". The following will describe the linear actuator 30 and the reciprocating pump 50 arranged so as to allow the axial direction to be aligned with the vertical direction. The present technology, however, is not limited to this, and it is allowable to use the linear actuator 30 and the reciprocating pump 50 arranged such that the axial direction comes in the horizontal direction or in an angled direction.

In the present embodiment, the linear actuator 30 and the reciprocating pump 50 are arranged with the axial direction oriented in the vertical direction. Note that while FIGS. 2 and 3 illustrate an example in which the reciprocating pump 50 is arranged below the linear actuator 30, the reciprocating pump 50 may be arranged above the linear actuator 30.

[Hydraulic Cylinder Unit]

As illustrated in FIGS. 2 and 3, the hydraulic cylinder unit (linear actuator 30) includes an electric motor 31, a hydraulic pump 32, a first hydraulic pipe 33, a second hydraulic pipe 34, a fixed portion 40, a hydraulic cylinder 41, and a hydraulic piston 42.

The hydraulic cylinder unit is provided on a top plate 101 of a cradle 100. The top plate 101 is supported by a leg 102, and the leg 102 is fixed to a structure such as a deck or an inner bottom plate of the hull.

The electric motor 31 is provided at an upper portion of the top plate 101. The electric motor 31 is controlled by the controller 21 and drives the hydraulic pump 32. An inverter motor or a servo motor is used as the electric motor 31, for example.

The hydraulic pump 32 is provided at an upper portion of the top plate 101. The hydraulic pump 32 is driven by the electric motor 31, and supplies hydraulic fluid into the hydraulic cylinder 41, thereby moving the hydraulic piston 42 in the vertical direction. Examples of the applicable hydraulic fluid include petroleum-based hydraulic oil, synthetic hydraulic fluid, and water-formed hydraulic fluid.

The hydraulic pump 32 is connected with the first hydraulic pipe 33 and the second hydraulic pipe 34. The hydraulic pump 32 is driven by the electric motor 31.

In a case where the electric motor 31 is a servo motor, the direction in which the hydraulic fluid is ejected from the hydraulic pump 32 is switched in accordance with the forward-reverse rotational directions of the electric motor 31. For example, during forward rotation of the electric motor 31, the hydraulic pump 32 sucks the hydraulic fluid in the first hydraulic pipe 33 and ejects the sucked hydraulic fluid to the second hydraulic pipe 34. Moreover, during reverse rotation of the electric motor 31, the hydraulic pump 32 sucks the hydraulic fluid in the second hydraulic pipe 34 and ejects the sucked hydraulic fluid to the first hydraulic pipe 33. In this case, the direction switching valve is unnecessary for the first hydraulic pipe 33 and the second hydraulic pipe 34.

In contrast, in a case where the electric motor 31 is an inverter motor, the direction in which the hydraulic fluid flows is changed by a direction switching valve (not illustrated) provided in the first hydraulic pipe 33 and the second hydraulic pipe 34.

Note that the flow rate and pressure of the hydraulic fluid in the first hydraulic pipe 33 and the second hydraulic pipe 34 are determined by the ejection amount of the hydraulic pump 32. In any case where the electric motor 31 is a servo motor and the electric motor 31 is an inverter motor, the flow rate and pressure of the hydraulic fluid can be adjusted by the rotation speed of the electric motor 31.

The fixed portion 40 is fixed to the top plate 101, arranged in the opening 101a provided on the top plate 101. The hydraulic cylinder 41 is fixed at an upper portion of the fixed portion 40, and the reciprocating pump 50 is fixed to the lower portion of the fixed portion 40. The fixed portion 40 is hollow cylinder and internally includes a cavity 48.

The hydraulic cylinder 41 includes a hydraulic fluid accommodation space 43 for accommodating hydraulic fluid and is mounted on the top surface of the top plate 101 such that the axial direction comes in the vertical direction. Moreover, a side wall of the hydraulic cylinder 41 includes an upper through hole 44 communicating with the upper end portion of the hydraulic fluid accommodation space 43 and a lower through hole 45 communicating with the lower end portion of the hydraulic fluid accommodation space 43. An outer opening portion of the upper through hole 44 is connected to the first hydraulic pipe 33, and an outer opening portion of the lower through hole 45 is connected to the second hydraulic pipe 34.

The hydraulic piston 42 includes a piston ring 42b. The hydraulic piston 42 includes a rider ring 51a vertically movably accommodated in the hydraulic fluid accommodation space 43 while allowing the piston ring 42b to be in contact with the inner wall surface of the hydraulic fluid accommodation space 43 of the hydraulic cylinder 41. The rider ring 51a has a function of correcting deflection in the horizontal direction when the hydraulic piston 42 moves in the vertical direction. The piston ring 42b has a function of closing a gap between the hydraulic piston 42 and the inner wall surface of the hydraulic fluid accommodation space 43.

The hydraulic piston 42 partitions the hydraulic fluid accommodation space 43 into an upper chamber 43a (the second chamber) above the hydraulic piston 42 and a lower chamber 43b (the first chamber) below the hydraulic piston 42.

The hydraulic piston 42 is of a double rod type and includes a piston rod 47 protruding to the outside from the upper portion and the lower portion of the hydraulic cylinder 41. The piston rod 47 moves up and down together with the hydraulic piston 42. Since the hydraulic piston 42 is a double rod type, the decrease amount in the volume of the upper chamber 43a when the hydraulic piston 42 moves upward is equal to the increase amount in the volume of the lower chamber 43b. The hydraulic piston 42 may be a single rod type. In this case, however, it is desirable to provide a pulsation prevention tank because pressure fluctuation occurs due to a change in the amount of hydraulic fluid that moves.

A bush 46 is provided at a portion of the hydraulic cylinder 41 through which the piston rod 47 passes. An oil seal is incorporated in the bush 46. The bush 46 supports the piston rod 47 such that it can move up and down, and prevents the hydraulic fluid from leaking out of the hydraulic fluid accommodation space 43.

The cavity 48 includes a coupling portion 49 connecting the lower end portion of the piston rod 47 with the upper end portion of the boosting piston 52 of the reciprocating pump 50. The coupling portion 49 moves up and down within the cavity 48 together with the up-down motion of the piston rod 47. Note that the coupling portion 49 has a function of adjusting the axial misalignment of the piston rod 47 of the hydraulic cylinder with the piston 52 of the reciprocating pump 50.

From the viewpoint of preventing gas leakage from the reciprocating pump 50, nitrogen gas at room temperature is externally supplied to the cavity 48. The nitrogen gas may be supplied to a rod packing portion 57 of the reciprocating pump 50. With the cavity 48, it is possible to suppress heat conduction to the low temperature heat source (liquid fuel) in the reciprocating pump 50 and to prevent the high temperature heat source (hydraulic fluid) in the hydraulic fluid accommodation space 43 from being cooled via the piston rod 47. Note that it is allowable to prevent the high temperature heat source from being cooled by installing an explosion-proof heater or an endothermic fin.

[Reciprocating Pump]

As the reciprocating pump 50, it is possible to use, for example, a reciprocating pump having a structure similar to that described in JP 5519857 B.

More specifically, the reciprocating pump 50 includes a boosting cylinder 51, the boosting piston 52, a cylinder liner 53, a cover 54, and a valve box 60.

The upper end portion of the boosting cylinder 51 is fixed to the lower end portion of the fixed portion 40. The side wall of the boosting cylinder 51 is fixed to the leg 102 of the cradle 100. The rod packing portion 57 is provided on an upper-side portion of the boosting cylinder 51.

The boosting cylinder 51 has an internal space for accommodating the boosting piston 52, the cylinder liner 53, and the valve box 60. The cover 54 is fixed to the lower end portion of the boosting cylinder 51. The cylinder liner 53 and the valve box 60 are fixed within the boosting cylinder 51 by the cover 54.

A suction port 55 is provided on the side wall of the boosting cylinder 51 at a height position at which the valve box 60 is fixed inside. The suction port 55 is connected with the low pressure fuel supply pipe 12.

The cover 54 includes an ejection port 56 penetrating in the vertical direction. The ejection port 56 is connected with the high pressure fuel supply pipe 13.

Note that the valve box 60 is provided below the boosting piston 52, and fuel is sucked into the lower portion of the boosting piston 52 inside the boosting cylinder 51 by moving the boosting piston 52 vertically upward. With this configuration, it is possible to arrange the suction port 55 of the reciprocating pump 50 at a lower position. The pressure of the liquid fuel in the low pressure fuel supply pipe 12 at the connecting portion with the suction port 55 is a pressure proportional to the difference between the height of the liquid surface of the liquid fuel in the liquid fuel tank 11 and the height of the suction port 55. Accordingly, by arranging the suction port 55 at a lower position, it is possible to increase the pressure of the liquid fuel in the low pressure fuel supply pipe 12 at the connecting portion with the suction port 55. This facilitates supply of the fuel from the suction port 55 into the boosting cylinder 51.

The upper end portion of the boosting piston 52 is coupled to the lower end portion of the piston rod 47 by the coupling portion 49, and the boosting piston 52 moves up and down in conjunction with the piston rod 47.

Moreover, a position sensor is provided at the upper end portion of the boosting piston 52. The position sensor detects the position of the boosting piston 52 in the vertical direction and outputs the position signal to the controller 21. Note that the speed of the boosting piston 52 can be obtained by time-differentiating the displacement of the boosting piston 52 using the position signal. That is, the position sensor can also be used as a speed sensor. Furthermore, acceleration of the boosting piston 52 can be obtained by time-differentiating the speed of the boosting piston 52. That is, the position sensor can also be used as an acceleration sensor.

Note that the position sensor may be attached to the hydraulic cylinder 41.

As the position sensor, for example, a magnetostrictive position sensor 70 or an ultrasonic sensor can be used. Herein, a case of using the magnetostrictive position sensor will be described.

More specifically, the magnetostrictive position sensor 70 includes a sensor probe 71 (magnetostrictive line), an annular magnet 72, and a detector 73. The sensor probe 71 is provided in the cavity 48 in the vertical direction. The annular magnet 72 is attached to the upper end portion of the boosting piston 52 so as to move up and down together with the boosting piston 52 along the sensor probe 71, which is inserted in the center of the annular magnet 72. The detector 73 for detecting distortion generated in the sensor probe 71 is provided at one end of the sensor probe 71. When a current pulse signal is given to the sensor probe 71, a magnetic field in the circumferential direction centered on the sensor probe 71 is generated. At the position of the sensor probe 71 that is at the same height as the magnet 72, a magnetic field is applied in the axial direction of the sensor probe 71, leading to generation of a combined magnetic field inclined to the axial direction. This field means local torsional distortion in the sensor probe 71. The detector 73 detects the position of the magnet 72 in the height direction by detecting the torsional distortion, and outputs to the controller 21, a position signal indicating the position of the boosting piston 52 in the height direction.

A rider ring 52*a* and a piston ring 52*b* are provided at a lower portion of the boosting piston 52. The boosting piston 52 is accommodated in the cylinder liner 53 so as to be movable in the vertical direction while allowing the rider ring 52*a* and the piston ring 52*b* to be in contact with the inner wall surface of the cylinder liner 53. The rod packing portion 57 is also equipped with the rider ring 51*a*. Each of these rider rings 51*a*, and 52*a* has a function of correcting deflection in the horizontal direction when the boosting piston 52 moves in the vertical direction. The piston ring 52*b* closes a gap between the boosting piston 52 and the inner wall surface of the cylinder liner 53 and seals the pressure of the boosted liquid fuel at the leading end.

The valve box 60 is fixed to the lower portion of the cylinder liner 53 in the boosting cylinder 51. The valve box 60 includes an ejection flow path 61, an ejection valve body 62, a suction flow path 64, and a suction valve body 65.

The ejection flow path 61 is provided so as to penetrate the valve box 60 in the vertical direction. In the ejection flow path 61, the ejection valve body 62 is accommodated movably in the vertical direction. The upper end portion side of the ejection flow path 61 is a small diameter portion whose inner diameter is smaller than the outer diameter of the ejection valve body 62. At the lower opening of the small diameter portion, a valve seat 63 is formed where the ejection valve body 62 is arranged. The ejection valve body 62 and the valve seat 63 constitute an ejection valve.

An opening on the lower side of the valve box 60 of the ejection flow path 61 is provided at a position opposing the ejection port 56 of the cover 54.

The suction flow path 64 is provided at a position communicating with the position of the boosting piston 52 from the outer wall of the valve box 60. The position of the suction flow path 64 is on the upper surface of the valve box 60. An opening on the outer wall side of the valve box 60 of the suction flow path 64 is provided at a position opposing the suction port 55 of the boosting cylinder 51.

At an outer peripheral portion of the opening on the upper surface side of the valve box 60 of the suction flow path 64, a valve seat 66 is formed for the suction valve body 65, and the suction valve body 65 is movably arranged in the vertical direction above the valve seat 66. The suction valve body 65 and the valve seat 66 constitute a suction valve.

The rod packing portion 57 is connected to the cavity 48 and is sealed with a seal ring so as not to allow the gas generated from vaporized liquid fuel to leak to the outside air. The liquid fuel that leaks without being sealed by the piston ring 52b is vaporized under a low pressure and is sealed by the rod packing portion 57. In order to prevent leakage of the gas vaporized from the liquid fuel to the outside, it is allowable to supply nitrogen gas to the rod packing portion 57 instead of supplying the gas to the cavity 48.

[Operation of Linear Actuator and Reciprocating Pump]

Next, operation of the linear actuator 30 and the reciprocating pump 50 using the servo motor as the electric motor will be described.

First, the hydraulic pump 32 is driven by the electric motor 31. Subsequently, as illustrated in FIG. 2, the hydraulic fluid in the upper chamber 43a is discharged from the upper through hole 44. The hydraulic fluid passes through the first hydraulic pipe 33 and the second hydraulic pipe 34 and is supplied to the lower chamber 43b (first chamber) via the lower through hole 45. Then, the hydraulic piston 42 moves upward in the hydraulic fluid accommodation space 43 such that the volume of the lower chamber 43b increases and the volume of the upper chamber 43a decreases. Note that there is no branch, or the like, in the first hydraulic pipe 33 and the second hydraulic pipe, and thus, the hydraulic pump 32 directs all of the hydraulic fluid flowing out from the upper chamber 43a toward the lower chamber 43b for supply.

When the hydraulic piston 42 moves upward, the boosting piston 52 coupled to the lower end portion of the piston rod 47 at the coupling portion 49 rises (moves in a first direction) in the cylinder liner 53. This causes the suction valve body 65 to move upward away from the valve seat 66, and the liquid fuel supplied from the suction port 55 passes through the suction flow path 64 and flows into the space inside the cylinder liner 53 at a lower portion of the boosting piston 52. At this time, the ejection valve body 62 is in a state of closing the opening of the valve seat 63.

Next, the controller 21 switches the rotational direction of the electric motor 31 to drive the hydraulic pump 32 in a direction opposite to that in FIG. 2, and as illustrated in FIG. 3, the hydraulic fluid in the lower chamber 43b is caused to be discharged from the lower through hole 45. The hydraulic fluid passes through the second hydraulic pipe 34 and the first hydraulic pipe 33 to be supplied to the upper chamber 43a (second chamber) from the upper through hole 44. Then, the hydraulic piston 42 moves downward in the hydraulic fluid accommodation space 43 such that the volume of the lower chamber 43b decreases and the volume of the upper chamber 43a increases. Note that there is no branch, or the like, in the first hydraulic pipe 33 and the second hydraulic pipe, and thus, the hydraulic pump 32 directs all of the hydraulic fluid flowing out from the lower chamber 43b toward the upper chamber 43a for supply.

When the hydraulic piston 42 moves downward, the boosting piston 52 coupled to the lower end portion of the piston rod 47 at the coupling portion 49 moves downward (moves in a second direction) in the cylinder liner 53. This causes the liquid fuel sucked into the space at a lower portion of the boosting piston 52 inside the cylinder liner 53 to push down the ejection valve body 62 to be separated from the valve seat 63, and the liquid fuel is discharged from the ejection port 56. At this time, the suction valve body 65 is in a state of closing the opening of the valve seat 66.

In this manner, by switching the rotation direction of the electric motor 31 and switching the driving direction of the hydraulic pump 32, it is possible to allow the hydraulic fluid to be alternately brought back and forth between the upper chamber 43a and the lower chamber 43b, and to cause the hydraulic piston 42 and the boosting piston 52 to reciprocate in the vertical direction, and to boost the liquid fuel sucked through the suction port 55 to be ejected from the ejection port 56.

Note that in the case of the linear actuator 30 using the inverter motor for the electric motor, by switching the flow direction of the hydraulic fluid by using the direction switching valve, it is possible to allow the hydraulic fluid to be alternately brought back and forth between the upper chamber 43a and the lower chamber 43b, to allow the hydraulic piston 42 and the boosting piston 52 to reciprocate in the vertical direction, and to boost the liquid fuel sucked from the suction port 55 to be ejected from the ejection port 56.

In the present embodiment, the pressure in the boosting cylinder 51 is controlled so as not to be the vapor pressure of the fuel or below in order to prevent cavitation in the boosting cylinder 51. More specifically, by decreasing the maximum acceleration of the boosting piston 52 when the reciprocating pump 50 sucks the fuel, it is possible to prevent the pressure inside the boosting cylinder 51 from becoming the vapor pressure of the fuel or below.

More specifically, the controller 21 controls the linear actuator 30 such that the maximum acceleration of the boosting piston 52 when the reciprocating pump 50 sucks the fuel is smaller than the case where the reciprocating pump is driven using the crankshaft. Note that in a case where the reciprocating pump is driven using the crankshaft, it is considered that the boosting piston performs simple harmonic motion with the same cycle time as the rotation cycle time of the crankshaft and with the same amplitude as the radius of rotation of the crankshaft. The stroke length of the boosting piston at this time is the rotational diameter (twice the amplitude) of the crankshaft.

In view of this, in the present embodiment, the controller 21 controls the linear actuator 30 such that the maximum acceleration of the boosting piston 52 at the time when the reciprocating pump 50 sucks the fuel becomes lower than in a case where the boosting piston 52 performs simple harmonic motion with the same amplitude and the same cycle time as the amplitude and cycle time in a case where the reciprocating pump is driven using the crankshaft.

More specifically, when the amplitude of reciprocation of the boosting piston 52 in the axial direction is A (A>0) and the reciprocating cycle time is T, the controller 21 controls the linear actuator 30 such that a maximum value of the absolute value of the acceleration that increases the absolute value of the speed of the boosting piston 52 at the time when the reciprocating pump 50 sucks the fuel is smaller than $A \cdot (2\pi/T)^2$ and such that a maximum value of the absolute value of the acceleration of the boosting piston 52 at the time when the reciprocating pump 50 ejects the fuel is larger than $A \cdot (2\pi/T)^2$.

Figure 4:
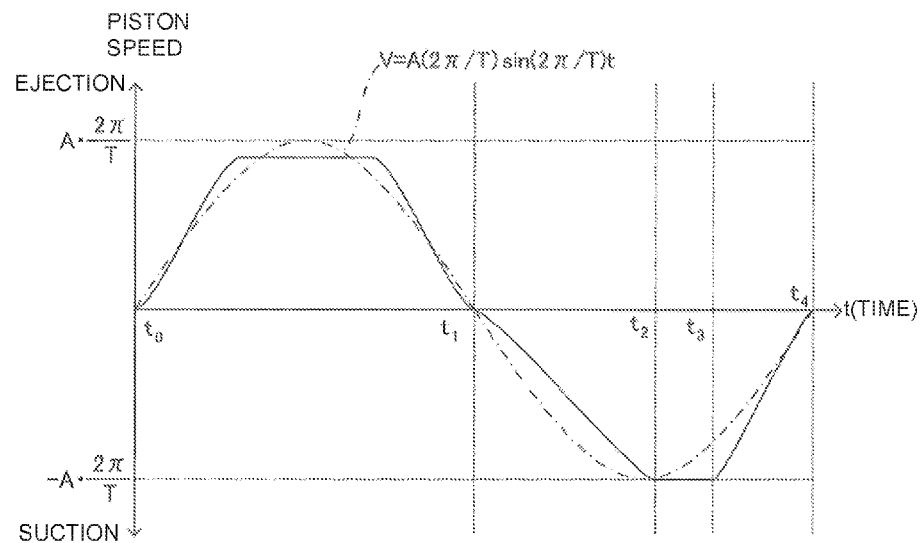
FIG. 4 is a diagram illustrating an example of the temporal change in the speed of the boosting piston 52.

The solid line in FIG. 4 indicates an example of the temporal change in the speed of the boosting piston 52 in the present embodiment, where the horizontal axis represents time and the vertical axis represents speed, with the speed of the boosting piston 52 at the time of ejection being positive. Specifically, the reciprocating pump 50 ejects the fuel from time t0 to time t1 when the piston speed is positive, and the reciprocating pump 50 sucks the fuel from time t1 to time t4 when the piston speed is negative.

Moreover, a one-dot chain line in FIG. 4 indicates a temporal change in the speed of the boosting piston in a case where the boosting piston is crank-driven. When the boosting piston is crank driven, the boosting piston performs simple harmonic motion. That is, when the amplitude of the boosting piston is A, the cycle time is T, the speed of the boosting piston is V, and the time is t, V can be expressed by the following formula (1).

$$V = A(2\pi/T)\sin(2\pi/T)t \qquad (1)$$

Moreover, when the acceleration during simple harmonic motion of the boosting piston is a, the a can be expressed by the following formula (2).

$$a = A(2\pi/T)^2 \cos(2\pi/T)t \qquad (2)$$

In the case where the boosting piston is crank driven, the reciprocating pump 50 also ejects the fuel from time t0 to time t1 at which the piston speed is positive, and the reciprocating pump 50 also sucks the fuel from time t1 to time t4 at which the piston speed is negative.

For comparison, the cycle time T and the stroke (twice the amplitude A) are set to be the same in the case of the present embodiment (solid line) and in the case of simple harmonic motion (one-dot chain line). In other words, the integrated value of the speed during the period from time t0 to time t1 (at ejection) is a same value 2A in the case of the present embodiment (solid line) and in the case of simple harmonic motion (one-dot chain line). Similarly, the integrated value of the speed during the period from time t1 to time t4 (at suction) is a same value −2A in the case of the present embodiment (solid line) and in the case of simple harmonic motion (one-dot chain line).

In the solid line in FIG. 4, the boosting piston 52 is accelerated during the period from the start of suction (t1) to t2, the boosting piston 52 is moved at a constant speed during the period from t2 to t3, and the boosting piston 52 is decelerated during the period from time t3 to the end of suction (t4). Herein, "to accelerate" represents increasing the absolute value of the speed of the boosting piston 52, and "to decelerate" represents decreasing the absolute value of the speed of the boosting piston 52.

In the solid line in FIG. 4, there is a time when the absolute value of the acceleration of the boosting piston 52 is the maximum value of the absolute value of the acceleration at the time of suction during the period from t1 to t2. The maximum value of the absolute value of this acceleration is the maximum value of the absolute value of the slope from t1 to t2 of the solid line in FIG. 4.

In contrast, in a case where the boosting piston performs simple harmonic motion (one-dot chain line), the absolute value of the acceleration of the boosting piston 52 is maximized at the time of starting suction (t1) during the period from t1 to t2, and the maximum value of the absolute value of the acceleration is the absolute value of the slope at t1 of the one-dot chain line in FIG. 4, namely, $A(2\pi/T)^2$.

As illustrated by the solid line in FIG. 4, in the present embodiment, the linear actuator 30 is controlled such that the maximum value of the absolute value of the acceleration of the boosting piston 52 at the time of suction (maximum value of the absolute value of the slope from t1 to t2 of the solid line) becomes smaller than the maximum value of the absolute value of the acceleration in the case of the simple harmonic motion ($A(2\pi/T)^2$, as the maximum value of the slope at t1 of the one-dot chain line). With this control, it is possible to prevent a drastic drop in the pressure inside the boosting cylinder 51 and to suppress the occurrence of cavitation.

Note that, when the period from t1 to t4 during which the reciprocating pump 50 sucks the fuel as the suction time (t4-t1) is defined as $T_1$, it is preferable that the maximum value of the absolute value of the acceleration of the boosting piston 52 at the time of suction (maximum value of the absolute value of the slope from t1 to t2 of the solid line) becomes smaller than $A(\pi/T_1)^2$.

Note that, in the case of simple harmonic motion, while the absolute value of the acceleration at the time of suction is maximized corresponds to the start time of suction (t1), there is no need, in the present embodiment, to control the speed of the boosting piston 52 such that the maximum acceleration is achieved at the start time of suction. For example, it is allowable to control such that a point of achieving the maximum absolute value of the acceleration of the boosting piston 52 comes after a point of starting suction of the fuel (t1) and before an elapsed time from the point of starting suction of the fuel (t1) reaches ¼ time of one cycle time.

Note that the stroke length is a height from a lowermost point to an uppermost point at the time of reciprocation of the boosting piston 52 in the up-down direction. The stroke length is set from the lowermost position of the boosting piston 52 in the cylinder liner 53. The lowermost position of the boosting piston 52 is a position where the volume of the space below the boosting piston 52 inside the cylinder liner 53 is minimized. By adjusting the stroke length on the basis of this position, all the liquid fuel in the reciprocating pump 50 is ejected in individual cycles regardless of the setting of the stroke length.

Figure 5:
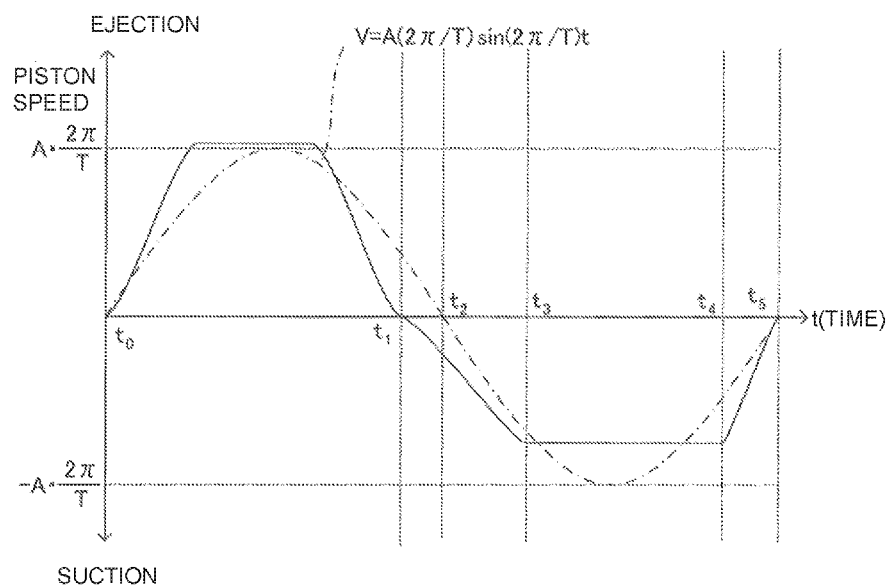
FIG. 5 is a diagram illustrating another example of the temporal change in the speed of the boosting piston 52.

The solid line in FIG. 5 indicates another example of the temporal change in the speed of the boosting piston 52 in the present embodiment, where the horizontal axis represents time and the vertical axis represents speed, with the speed of the boosting piston at the time of ejection being positive. Specifically, the reciprocating pump 50 ejects the fuel from time t0 to time t1 when the piston speed is positive, and the reciprocating pump 50 sucks the fuel from time t1 to time t5 when the piston speed is negative.

Moreover, a one-dot chain line in FIG. 5 indicates a temporal change in the speed of the boosting piston 52 in a case where the boosting piston is crank-driven (in simple harmonic motion). For comparison, the cycle time T and the stroke (=2A) are set to be the same. In the case where the boosting piston 52 is crank driven (one-dot chain line), the reciprocating pump 50 also ejects the fuel from time t0 to time t2 at which the piston speed is positive, and the reciprocating pump 50 also sucks the fuel from time t2 to time t5 at which the piston speed is negative. When the boosting piston 52 is crank driven, the boosting piston performs simple harmonic motion. That is, when the amplitude of the boosting piston is A, the cycle time is T, the speed of the boosting piston is V, and the time is t, V can be expressed by the following formula (1).

$$V=A(2\pi/T)\sin(2\pi/T)t \quad (1)$$

Moreover, when the acceleration during simple harmonic motion of the boosting piston is a, the a can be expressed by the following formula (2).

$$a=A(2\pi/T)^2 \cos(2\pi/T)t \quad (2)$$

For comparison, the cycle time T and the stroke (twice the amplitude A) are set to be the same in the case of the present embodiment (solid line) and in the case of simple harmonic motion (one-dot chain line). In other words, the integrated value of the speed during the period from time t0 to time t1 (at ejection) according to the present embodiment (solid line) is the same value 2A, that is equal to the integrated value of the speed during the period from time t0 to time t2 (at ejection) in the case of simple harmonic motion (one-dot chain line). Similarly, the integrated value of the speed during the period from time t1 to time t5 (at suction) according to the present embodiment (solid line) is the same value −2A, that is equal to the integrated value of the speed during the period from time t2 to time t5 (at suction) in the case of simple harmonic motion (one-dot chain line).

In the solid line in FIG. 5, the boosting piston 52 is accelerated during the period from the start of suction (t1) to t3, the boosting piston 52 is moved at a constant speed during the period from t3 to t4, and the boosting piston 52 is decelerated during the period from time t4 to the end of suction (t5).

In the solid line in FIG. 5, there is a case where the absolute value of the acceleration of the boosting piston 52 is the maximum value of the absolute value of the acceleration at the time of suction during the period from t1 to t3. The maximum value of the absolute value of this acceleration is the maximum value of the absolute value of the slope from t1 to t3 of the solid line in FIG. 5.

In contrast, in a case where the boosting piston performs simple harmonic motion (one-dot chain line), the absolute value of the acceleration of the boosting piston 52 is maximized at the time of starting suction (t2), and the maximum value of the absolute value of the acceleration is the absolute value of the slope at t2 of the one-dot chain line in FIG. 5, namely, $A(2\pi/T)^2$.

Even in the case where the boosting piston 52 is controlled, as illustrated in FIG. 5, the linear actuator 30 is controlled such that the maximum value of the absolute value of the acceleration of the boosting piston 52 at the time of suction (maximum value of the absolute value of the slope from t1 to t3 of the solid line) becomes smaller than the maximum value of the absolute value of the acceleration in the case of the simple harmonic motion ($A(2\pi/T)^2$, as the maximum value of the slope at t2 of the one-dot chain line). With this control, it is possible to prevent a drastic drop in the pressure inside the boosting cylinder 51 and to suppress the occurrence of cavitation.

Note that, when the period from t1 to t5 during which the reciprocating pump 50 sucks the fuel as the suction time (t5-t1) is defined as $T_2$, it is preferable that the maximum value of the absolute value of the acceleration of the boosting piston 52 at the time of suction (maximum value of the absolute value of the slope from t1 to t3 of the solid line) becomes smaller than $A(\pi/T_2)^2$.

Note that in the case of FIG. 4, the period (time from t0 to t1) during which the fuel is ejected and the period during which the fuel is sucked (from t1 to t4) in one cycle (from t0 to t4) of the boosting piston 52 are equal to each other. In contrast, in the case of FIG. 5, the period (from t1 to t5) during which the fuel is sucked is longer than the period (from t0 to t1) during which the fuel is ejected in one cycle (time from t0 to t5) of the boosting piston 52.

With this configuration, it is possible to further increase the period (from t1 to t3) during which the boosting piston 52 is accelerated at the time of suction, and it is possible to further decrease the maximum value of the absolute value of the acceleration at the time of suction.

Moreover, as illustrated in FIG. 5, by setting the fuel suction period (from t1 to t5) to be longer than the fuel ejection period (from t0 and t1), it is possible to set the maximum value of the absolute value of the speed of the boosting piston 52 at the time of suction (maximum value of the absolute value of the speed during the period from t3 to t4 of the solid line) to be smaller than $A(2\pi/T)$ that is the maximum value of the absolute value of the speed in the case of simple harmonic motion. Accordingly, it is possible to decrease the maximum value of the absolute value of the acceleration needed to accelerate to the maximum speed.

Note that in the case of using a plurality of fuel supply units, it is possible to eject the fuel from the reciprocating pump 50 of another fuel supply unit while the fuel is being sucked by the reciprocating pump 50 of one fuel supply unit. For example, by using the reciprocating pump 50 in each of the three fuel supply units 20A, 20B, and 20C, it is possible to use the time in which other two reciprocating pumps 50 are ejecting the fuel so as to perform suction of the fuel at one reciprocating pump 50. In other words, when suction and ejection is defined as one cycle, it is allowable to cause each of the reciprocating pumps 50 to perform ejection in ⅓ time of one cycle time and perform suction in ⅔ time of one cycle time. Similarly, when n fuel supply units (n is a natural number of three or more) are used, it is allowable to cause each of the reciprocating pumps 50 to perform ejection in 1/n time of one cycle time and perform suction in (n−1)/n time of one cycle time. With this configuration, it is possible to set the moving speed of the boosting piston 52 at the time of sucking the fuel to be slower than the speed at the time of ejecting the fuel, and to prevent drastic drop in the pressure within the boosting cylinder 51 and prevent the occurrence of cavitation. Even in this case, it is possible to adjust the total ejection amount of the fuel by adjusting one cycle time.

Note that while the above embodiment describes the case where the time of sucking the fuel and the time of ejecting the fuel are the same (FIG. 4) and the case where the time of sucking the fuel is longer than the time of ejecting the fuel (FIG. 5), the time of sucking the fuel may be shorter than the time of ejecting the fuel.

According to the present embodiment, by moving the boosting piston 52 in the vertical direction and by arranging such that the reciprocating pump 50 sucks the fuel when the boosting piston 52 is moved upward, the gravity of the boosting piston 52 acts on the linear actuator 30 when the boosting piston 52 is moved upward by the linear actuator 30. With this arrangement, it is possible to decrease the speed of moving the boosting piston 52 upward and to suppress the occurrence of cavitation.

In addition, since the hydraulic piston 42 and the boosting piston 52 are moved in the vertical direction, the hydraulic cylinder 41 and the boosting cylinder 51 also receive a force in the vertical direction, as reaction. This suppress a force acting in the horizontal direction on the installation site of the hydraulic cylinder 41 and the boosting cylinder 51 even when the hydraulic piston 42 and the boosting piston 52 are driven, making it possible to easily fix the hydraulic cylinder 41 and the boosting cylinder 51. Moreover, it is possible to reduce the floor area needed for installing the hydraulic cylinder 41 and the boosting cylinder 51.

Moreover, since the hydraulic piston 42 and the boosting piston 52 are moved in the vertical direction, no local wear is generated in the piston rings 42b and 52b and the rider rings 51a and 52a.

Moreover, in the case of using a servo motor, it is possible to switch the moving direction of the hydraulic piston 42 by switching the flow direction of the hydraulic fluid to be supplied into the hydraulic cylinder 41 in accordance with the direction of forward/reverse rotation of the hydraulic pump 32. In this case, since the flow direction of the hydraulic fluid is not switched by any direction switching valve, there is no need to continuously drive the hydraulic pump 32 at a rated rotation speed. This makes it possible to reduce energy consumption compared with the case where the hydraulic pump 32 is continuously driven at the rated rotation speed.

Moreover, since the plurality of fuel supply units 20A, 20B, and 20C are provided in parallel with each other between the low pressure fuel supply pipe 12 and the high pressure fuel supply pipe 13, the number of fuel supply units can be easily changed. Moreover, even when trouble occurs in any one of the plurality of fuel supply units or maintenance is performed, it is possible to remove the corresponding fuel supply unit while continuously driving other fuel supply units.

Moreover, since the plurality of fuel supply units 20A, 20B, and 20C can be controlled independently, the number of fuel supply units operating in accordance with the fuel demand of the internal combustion engine 90 can also be changed.

Moreover, by providing a position sensor for detecting the position of the boosting piston 52, it is possible to reliably adjust the speed and position of the boosting piston 52.

Note that while the above description is the case of using three fuel supply units 20A, 20B, and 20C, the present technology is not limited to this, and any number of fuel supply units can be used. Moreover, the shape of the reciprocating pump 50 is not limited to the one illustrated in FIGS. 2 and 3, but a reciprocating pump having an arbitrary shape can be used.

Moreover, while the above description is a case of the fuel supply device mounted on a ship, the present technology is not limited to this. The linear actuator 30 and the reciprocating pump 50 can be installed on any structure. For example, the linear actuator 30 and the reciprocating pump 50 may be mounted on a vehicle body of an automobile, or the linear actuator 30 and the reciprocating pump 50 may be installed on a floor of a building frame.

Modification Example

Figure 6:
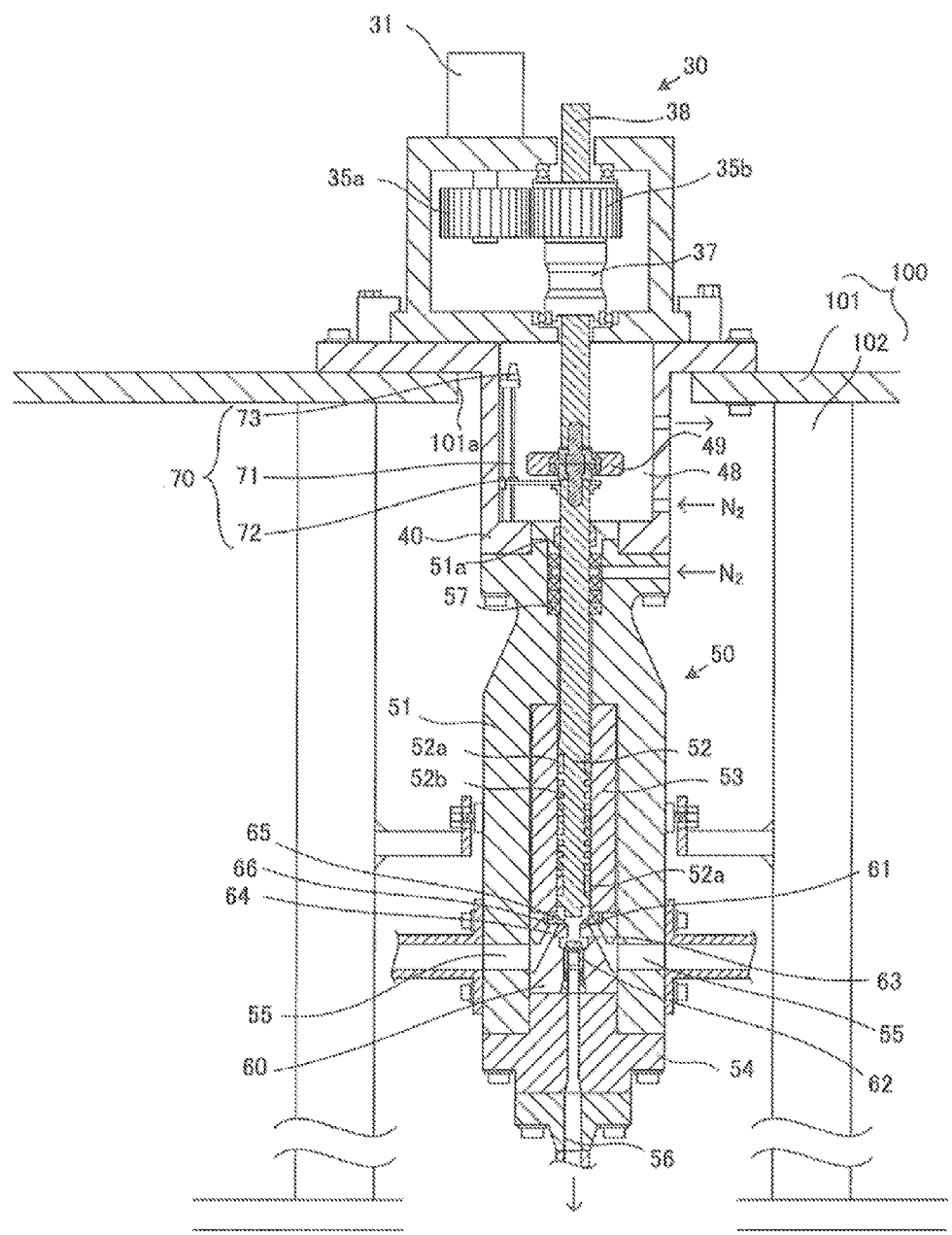
FIG. 6 is a diagram illustrating a fuel supply unit using an electric cylinder unit as the linear actuator 30.

FIG. 6 is a diagram illustrating a fuel supply unit using an electric cylinder unit as the linear actuator 30. Note that the same reference numerals are given to the configurations similar to the configurations in FIGS. 2 and 3 and description thereof will be omitted.

The electric cylinder unit includes an electric motor 31, gears 35a and 35b, a ball nut 37, and a ball screw 38.

The gear 35a is rotated by the power of the electric motor 31, and the rotation of the gear 35a is transmitted to the gear 35b.

The gear 35b is provided integrally with the ball nut 37, and transmits the rotation of the gear 35a to the ball nut 37.

The ball nut 37 is screwed with the ball screw 38 and rotates together with the gear 35b.

The lower end of the ball screw 38 is coupled to the upper end of the boosting piston 52 via the coupling portion 49. Rotation of the ball nut 37 causes the ball screw 38 to move in the axial direction. Movement of the ball screw 38 in the axial direction causes the boosting piston 52 to move in the axial direction.

In this modification example, it is possible to achieve an effect similar to the case of using the hydraulic cylinder unit as the linear actuator 30.

Note that in a case where the pump installation location is a non-explosion-proof location or in a Zone-2 (Class I Division 2) hazard location, the rotation of the electric motor 31 may be transmitted to the ball nut using a pulley and a timing belt instead of the gears 35a and 35b.

The invention claimed is:

1. A fuel supply device for supplying fuel into a combustion chamber of an internal combustion engine, the fuel supply device comprising:
   a linear actuator;
   a reciprocating pump having a boosting piston driven by the linear actuator and configured to reciprocate in an axial direction, the reciprocating pump being configured to alternately repeat suction of the fuel and ejection of the fuel more boosted than the fuel at a time of suction by reciprocation of the boosting piston in the axial direction; and
   a controller configured to control driving of the linear actuator,
   wherein, when an amplitude of reciprocation of the boosting piston in the axial direction is A (A>0) and a reciprocating cycle time is T, the controller is configured to control the linear actuator
   such that a maximum value of an absolute value of acceleration at a time when the reciprocating pump sucks the fuel with an absolute value of speed of the boosting piston increasing is smaller than $A \cdot (2\pi/T)^2$, and
   such that a maximum value of the absolute value of the acceleration of the boosting piston at a time when the reciprocating pump ejects the fuel is larger than $A \cdot (2\pi/T)^2$.

2. A fuel supply device for supplying fuel into a combustion chamber of an internal combustion engine, the fuel supply device comprising:
   a low pressure fuel supply pipe to which low pressure fuel is supplied;
   a high pressure fuel supply pipe to which high pressure fuel to be supplied into the combustion chamber is supplied;
   a plurality of fuel supply units provided between the low pressure fuel supply pipe and the high pressure fuel supply pipe, each of the fuel supply units being configured to boost the fuel in the low pressure fuel supply pipe and supply the boosted fuel to the high pressure fuel supply pipe; and
   a control unit configured to control the plurality of fuel supply units,
   wherein each of the fuel supply units comprises:
   a linear actuator;

a reciprocating pump having a boosting piston driven by the linear actuator and configured to reciprocate in an axial direction, the reciprocating pump being configured to alternately repeat suction of the fuel and ejection of the fuel more boosted than the fuel at a time of suction by reciprocation of the boosting piston in the axial direction; and a controller configured to control driving of the linear actuator, wherein, when an amplitude of reciprocation of the boosting piston in the axial direction is A (A>0) and a reciprocating cycle time is T, the controller is configured to control the linear actuator such that a maximum value of an absolute value of acceleration at a time when the reciprocating pump sucks the fuel with an absolute value of speed of the boosting piston increasing is smaller than $A \cdot (2\pi/T)^2$, and such that a maximum value of the absolute value of the acceleration of the boosting piston at a time when the reciprocating pump ejects the fuel is larger than $A \cdot (2\pi/T)^2$, and the control unit controls each of the controllers such that, when any one of the plurality of fuel supply units ejects fuel, another fuel supply unit sucks the fuel.

3. The fuel supply device according to claim 1, wherein the controller is configured to control the linear actuator such that a point of achieving the maximum value of the acceleration of the boosting piston at the time when the reciprocating pump sucks the fuel comes after a point of starting suction of the fuel and before an elapsed time from the point of starting suction of the fuel reaches ¼ time of the cycle time.

4. The fuel supply device according to claim 1, wherein the reciprocating pump includes a boosting cylinder accommodating the boosting piston, the boosting piston vertically moving, and is configured to suck the fuel into a portion inside the boosting cylinder below the boosting piston by vertical upward movement of the boosting piston, and is configured to control boost and eject the fuel by vertical downward movement of the boosting piston.

5. The fuel supply device according to claim 1, further comprising a speed sensor for detecting the speed of the boosting piston in the axial direction.

6. The fuel supply device according to claim 1, wherein the linear actuator is a hydraulic cylinder unit, the hydraulic cylinder unit including:

a hydraulic cylinder having a hydraulic fluid accommodation space for accommodating hydraulic fluid and arranged such that the axial direction of the hydraulic cylinder is aligned with a vertical direction;

a hydraulic piston movably arranged in the axial direction within the hydraulic cylinder, and configured to partition the hydraulic fluid accommodation space into a first chamber and a second chamber;

a piston rod configured to couple the hydraulic piston with the boosting piston;

a hydraulic pump configured to move the hydraulic piston in a first direction in the axial direction by supplying hydraulic fluid to the first chamber and to move the hydraulic piston in a second direction in the axial direction by supplying hydraulic fluid to the second chamber; and an electric motor configured to drive the hydraulic pump such that the hydraulic piston reciprocates in the axial direction, and the controller is configured to control a movement of the hydraulic piston within the hydraulic cylinder by controlling the electric motor.

7. The fuel supply device according to claim 6, wherein the hydraulic cylinder unit further includes:

a first hydraulic pipe with an internal space closed therein, the first hydraulic pipe having one end of which connected to the hydraulic pump and an other end connected to the first chamber and configured to direct all the hydraulic fluid ejected from the hydraulic pump toward the first chamber for supply and configured to return all the hydraulic fluid discharged from the first chamber toward the hydraulic pump; and a second hydraulic pipe with an internal space closed therein, the second hydraulic pipe having one end of which connected to the hydraulic pump and an other end connected to the second chamber and configured to direct toward the second chamber all the hydraulic fluid ejected from the hydraulic pump for supply and configured to return toward the hydraulic pump all the hydraulic fluid discharged from the second chamber.

8. The fuel supply device according to claim 1, wherein the linear actuator is an electric cylinder unit, and includes:

an electric motor;

a ball nut configured to rotate by a power of the electric motor; and a ball screw to which the ball nut is screwed, being coupled with the boosting piston, an axial direction of the ball screw being aligned with the axial direction of the boosting piston, and configured to move in the axial direction of the ball screw by rotation of the ball nut, and the controller is configured to control movement of the ball screw in the axial direction by controlling the electric motor.

9. A fuel supply method for supplying fuel into a combustion chamber of an internal combustion engine, the fuel supply method comprising a step of controlling a linear actuator that is configured to drive a boosting piston to reciprocate in an axial direction thereof for alternately repeating suction of the fuel and ejection of the fuel more boosted than the fuel at a time of suction, where an amplitude of reciprocation in the axial direction of the boosting piston in a reciprocating pump is A (A>0) and a reciprocating cycle time of the reciprocation is T, the linear actuator being controlled, such that a maximum value of an absolute value of acceleration at a time of the suction of the fuel with an absolute value of speed of a boosting piston increasing is smaller than $A \cdot (2\pi/T)^2$, and such that a maximum value of the absolute value of the acceleration of the boosting piston at a time of the ejection of the fuel is larger than $A \cdot (2\pi/T)^2$.

* * * * *